United States Patent
Zheng et al.

(10) Patent No.: US 11,341,996 B2
(45) Date of Patent: May 24, 2022

(54) POSITIONING METHOD AND DEVICE FOR HOLOGRAM IN DISK-TYPE HOLOGRAPHIC STORAGE

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: AMETHYSTUM STORAGE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/152,196

(22) Filed: Jan. 19, 2021

(65) Prior Publication Data
US 2021/0225400 A1   Jul. 22, 2021

(30) Foreign Application Priority Data

Jan. 21, 2020 (CN) .......................... 202010070685.2

(51) Int. Cl.
*G11B 7/0065* (2006.01)
*G11B 7/007* (2006.01)

(52) U.S. Cl.
CPC ........ *G11B 7/0065* (2013.01); *G11B 7/00772* (2013.01)

(58) Field of Classification Search
None
See application file for complete search history.

(56) References Cited

U.S. PATENT DOCUMENTS

2005/0002311 A1 * 1/2005 Ichihara ............... G11B 7/0065
   369/103
2010/0232278 A1 * 9/2010 Ogasawara ........ G11B 7/00781
   369/100

(Continued)

FOREIGN PATENT DOCUMENTS

JP     2018137030 A  *  8/2018

OTHER PUBLICATIONS

English Translation of Yamamoto, JP 2018-137030 A, Aug. 2018.*

*Primary Examiner* — Peter Vincent Agustin
(74) *Attorney, Agent, or Firm* — Muncy, Geissler, Olds & Lowe, P.C.

(57) ABSTRACT

According to a positioning method for a hologram in a disk-type holographic storage medium, a guide groove is formed in advance in the disk-type storage medium and is scribed with a positioning marker that includes index information, position information and crossing angle information. The positions of a positioning laser beam and a recording/reproducing laser beam are applied to the same medium position. When an optical head accesses a recording/reading position at a high speed, the shift multiplex recording/reading is performed starting from a marker position. A servo system controls the laser beams to move along the guide groove and ensures that a focused beam is focused on the medium. According to the method, the position and angular information can be quickly positioned in process of performing cross-shift multiplex recording/reading, the recording/reading speed of the system is improved, and random access is achieved.

10 Claims, 5 Drawing Sheets

(56) References Cited

U.S. PATENT DOCUMENTS

| | | | | |
|---|---|---|---|---|
| 2011/0096648 A1* | 4/2011 | Saito | ................... | G11B 7/0956 |
| | | | | 369/47.49 |
| 2011/0134730 A1* | 6/2011 | Ishimoto | .............. | G11B 7/0917 |
| | | | | 369/44.13 |
| 2021/0201950 A1* | 7/2021 | Zheng | .................. | G11B 7/0065 |
| 2021/0225400 A1* | 7/2021 | Zheng | .................. | G11B 7/0065 |

* cited by examiner

POSITIONING METHOD AND DEVICE FOR HOLOGRAM IN DISK-TYPE HOLOGRAPHIC STORAGE

CROSS REFERENCE TO RELATED APPLICATIONS

The present application claims priority from Chinese Patent Application No. 202010070685.2 filed on Jan. 21, 2020, all of which are hereby incorporated herein by reference.

TECHNICAL FIELD

The present invention relates to the technical field of optical holographic storage, in particular to a positioning method and device for a hologram in a disk-type holographic storage medium.

BACKGROUND ART

A spherical reference beam shift multiplex storage method records a hologram using a spherical wave as a reference beam. When the reference beam is the spherical wave, the hologram cannot be reproduced by simply shifting a small distance, and then a new hologram can be recorded at that position, which is repeated multiple times, and this method is called shift multiplex recording. In this method, shift selectivity on a plane of an optical axis of a signal light and a reference light is determined by the Bragg conditions. However, a diffracted intensity is not sensitive to a shift distance in a direction perpendicular to the plane direction, so that an interval required for independent reproduction of two holograms is large, and it is difficult to increase storage density. Therefore, a cross-shift multiplex method is adopted, including the following steps: firstly performing two-dimensional shift multiplex recording on an intersecting line of an incident light plane and a medium; and then performing a second coverage shift multiplex recording by rotating the medium on a medium plane, which are repeated multiple times. The cross-shift multiplex method solves the problem that a multiplexing number is insufficient in a spherical wave shift multiplex recording method.

The present invention provides a beam positioning method and device when performing cross-shift multiplex recording on a disk-type medium, so that a recording/reading speed of a system is improved to enable random recording/reading.

SUMMARY OF THE INVENTION

The present invention aims to overcome at least one of the deficiencies in the prior art, provides a positioning method and device for a hologram in a disk-type holographic storage medium, and provides a storage medium, thereby achieving positioning of a beam during multiplexing, and improving a recording/reading speed of a system to enable random recording/reading.

The positioning method for the hologram in the disk-type holographic storage medium provided by the present invention is used to position a recording/reproducing beam when holographic recording/reproducing is performed, in which the storage medium is divided into zones in a radial direction, markers provided on circular guide grooves in each zone are taken as start positions of recording/reproducing, firstly the recording/reproducing beam is preliminarily positioned with positioning-beam detection markers when recording/reproducing is performed, and multiplex recording/reproducing of the hologram is performed when detecting the markers.

Each marker includes at least two-dimensional position information of the marker, and the recording/reproducing beam is positioned to a target marker according to the two-dimensional position information of the marker.

Starting from the marker, the recording/reproducing beam is accurately positioned according to a linear guide groove provided in a cross-shift multiplexing/reproducing direction.

The linear guide groove is provided with rotation angle information and sector information, and the recording/reproducing beam is accurately positioned according to the rotation angle information and the sector information to realize multiplex recording/reproducing.

The linear guide groove is provided with a plurality of patterns, and when recording/reproducing data, firstly a positioning beam is used to read a position deviation signal formed by the patterns in a liner guide groove direction and a direction perpendicular to the liner guide groove direction to detect whether a position of a recording/reading beam is correct, the recording/reading beam is controlled to a correct position according to the position deviation signal, and then recording/reading of the data is started.

The correct position is an optical track, position deviation is obtained by comparing a light intensity difference of the patterns in the liner guide groove direction and the direction perpendicular to the liner guide groove direction, and the light intensity difference on the optical track is 0 or a preset value.

Accesses to a circular guide groove, a linear guide groove and the markers are performed by relative movement of the recording/reading beam and a disk.

The positioning beam can be a reference beam or a beam from a light source different from that of the reference beam.

The present invention further provides the disk-type holographic storage medium, a recording/reproducing area of the storage medium is formed with the circular guide groove and the linear guide groove, and the circular guide groove is provided with the markers at a constant interval.

The storage medium is divided into zones in the radial direction by the circular guide groove, and the linear guide groove extends in a direction of grating vector of the hologram while starting from the marker positions.

Each marker includes two-dimensional position information of the marker.

The linear guide groove is provided with rotation angle information and sector information.

A plurality of patterns are recorded on the linear guide groove, and are symmetrical about the center of the guide groove.

A positioning device for the hologram in the disk-type holographic storage medium provided by the present invention includes: a first optical system for recording/reproducing information and generating the recording/reproducing beam; a translation stage for supporting translation of the storage medium that is provided with the circular guide groove and the linear guide groove; and a second optical system for generating the positioning beam that is used to position the recording/reproducing beam, in which the recording/reproducing beam and the positioning beam act on the same position of the storage medium, and multiplex recording/reproducing of the hologram is started to be performed along the liner guide groove by adopting the positioning beam to position the recording/reproducing beam on the markers of the circular guide groove.

The positioning device further includes a servo system that controls a laser beam to move along the circular guide groove and the liner guide groove and ensures that a focused beam is focused on the medium.

The servo system also includes a comparator for comparing the position deviation signal read by the positioning beam from a specific position of the storage medium, and driving the translation stage to support the translation of the storage medium according to the position deviation signal, so that the positioning beam and the recording/reproducing beam are located at a recording/reproducing position.

The position deviation signal is the light intensity difference of the same pattern on the linear guide groove.

The translation stage includes a multiplexing-direction translation mechanism and a translation mechanism in a direction perpendicular to the multiplexing direction. The first multiplexing-direction translation mechanism is used for controlling the translation stage to support the storage medium to translate in a shift multiplex moving direction of the storage medium, and the translation mechanism in the direction perpendicular to the multiplexing direction is used for controlling the translation stage to support the storage medium to translate in the direction perpendicular to the multiplexing direction, so that the positioning beam and the recording/reproducing beam are located on the optical track.

The multiplexing-direction translation mechanism includes a stepper translation mechanism which controls the translation stage to support the storage medium to translate while taking a distance moved during holographic storage shift multiplexing as a stepper distance in the multiplexing direction.

The translation stage also includes a preliminary positioning mechanism that controls movement of the storage medium such that the positioning beam and the recording/reproducing beam are located at the specific position of the storage medium.

The preliminary positioning mechanism includes a translation and/or rotation and/or inversion positioning mechanism.

The present invention provides a beam positioning method and device and the storage medium when performing cross-shift multiplex recording on a disk-type medium by using the positioning beam, so that the recording/reading speed of the system is improved to enable random recording/reading. Compared with the prior art, the beneficial effects of the present invention are as follows. The positioning beam may use the same laser as the recording/reproducing beam or a laser with a different wavelength as the light source. When the recording/reproducing position of the medium is accessed at a high speed, the positioning beam moves along the guide groove formed on a disk in advance, and shift multiplex recording/reproducing is performed when detecting a positioning marker. A positioning laser beam and a recording/reproducing laser beam are applied to the same medium position, and control the beam to travel along the guide groove. Beam control includes focus control and track control. In a cross-shift multiplex recording method, shift multiplex recording is overwritten by rotating the medium. According to the present invention, the disk-type medium is used to perform cross-shift multiplex storage while being rotated several times at a fixed angle. According to the positioning method and device provided by the invention, random access can be achieved even in the medium that is rotated and used.

Figure 7:
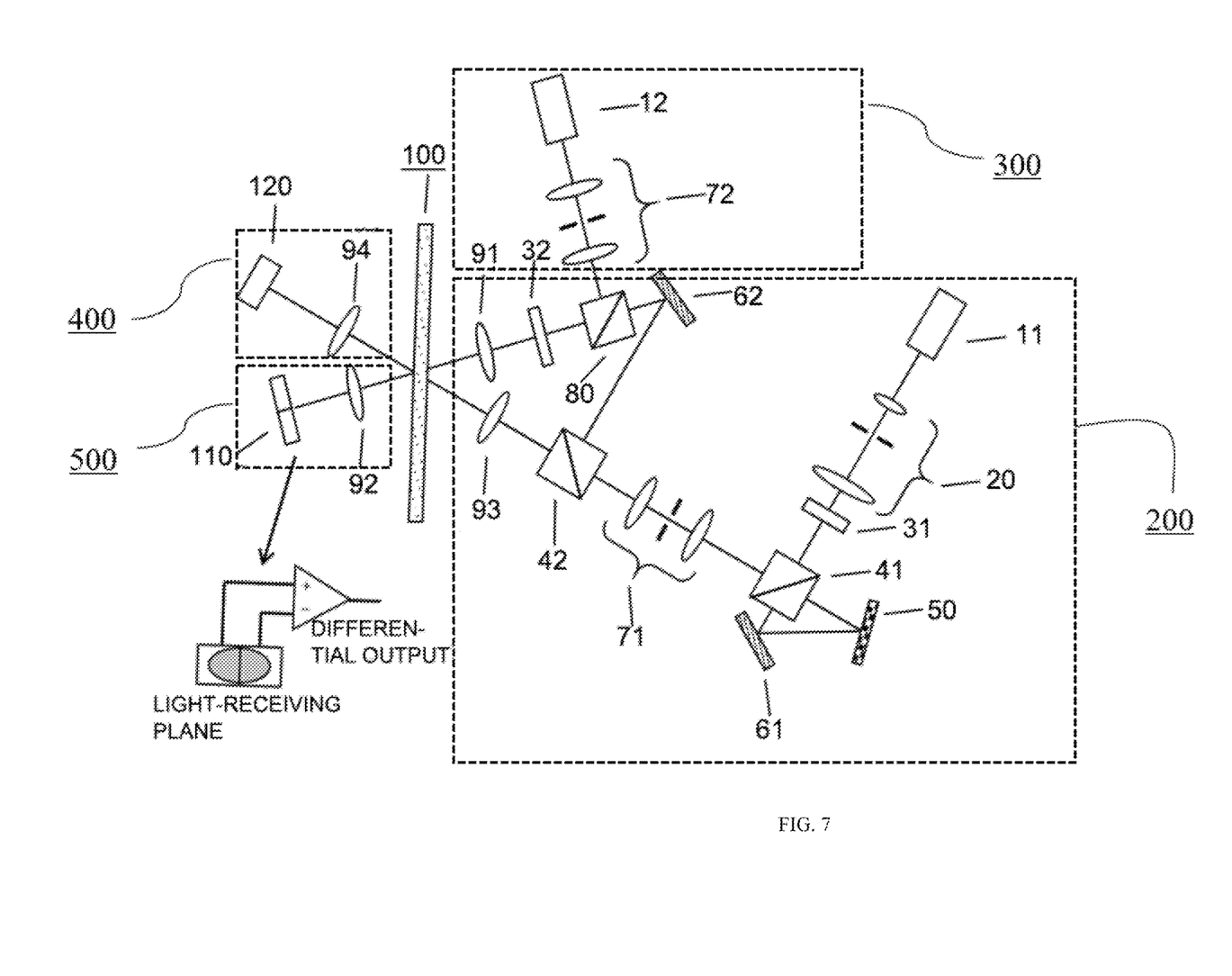
FIG. 7 is a diagram of an optical system for the cross-shift multiplex recording.

Reference Numerals: a holographic storage medium is a disk 100; a first optical system 200 includes a first laser 11, a beam expander 20, a first half-wave plate 31, a first polarizing beam splitter prism 41, a spatial light modulator 50, a first mirror 61, a first relay lens group 71, a second polarizing beam splitter prism 42, a second mirror 62, a depolarizing beam splitter prism 80, a second half-wave plate 32, a first Fourier lens 91, and a third Fourier lens 93; a second optical system includes a second laser 12 and a second relay lens group 72; a comparator 500 includes a second Fourier lens 92 and a two-divided photoelectric sensor 110; and a reproducing apparatus 400 includes a fourth Fourier lens 94 and a high-speed camera 120.

EMBODIMENTS

The drawings of the present invention are for illustration purpose only and are not intended to limit the present invention. Some components in the drawings may be omitted, enlarged, or reduced for better illustrating the embodiments, and sizes of these components do not represent sizes of actual products. For those skilled in the art, it will be understood that some known structures in the drawings and descriptions thereof may be omitted.

Embodiment 1

Figure 1:
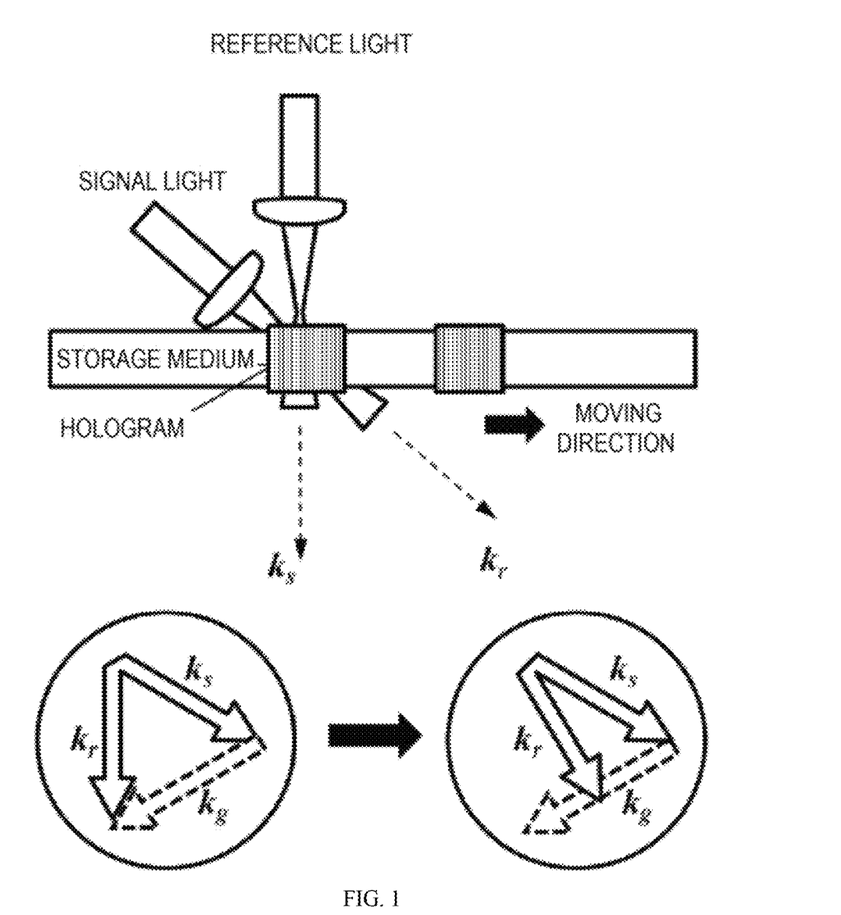
FIG. 1 is a principle diagram of a shift multiplex recording.

As shown in FIG. 1, in a method of shift multiplex recording/reproducing by using a spherical wave as a reference light, an incident plane of a signal light coincides with that of the reference light, and an intersecting line of the incident plane and a medium is taken as an axis. The Bragg conditions are mismatched and the hologram cannot be reproduced by simply moving the medium a small distance along the axis after recording a hologram, then a new hologram is recorded, and both the holograms can be reproduced independently, which is the shift multiplex recording. In this method, when the medium is only moved by several microns in an axial direction, the Bragg conditions formed by the signal light, the reference light and the grating vector are mismatched, and the hologram cannot be reproduced. However, due to the fact that a shift amount required to reproduce the hologram independently in the direction perpendicular to the axis is quite large, this method cannot achieve high density storage.

Figure 2:
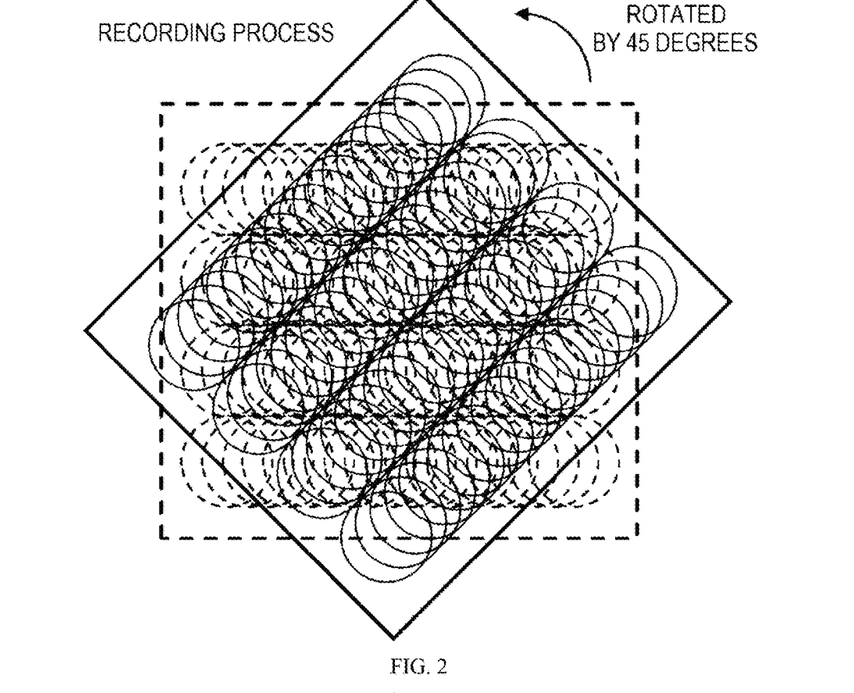
FIG. 2 is a principle diagram of a cross-shift multiplex recording.

Therefore, a cross-shift multiplex recording method is employed to perform multiplexing of the hologram. As shown in FIG. 2, the method includes the following steps: firstly performing a two-dimensional shift multiplex recording in a specific axis direction; and then performing a second coverage shift multiplex recording by rotating the medium on a medium plane, which are repeated multiple times. This method is called cross-shift multiplex recording, which solves the problem that a multiplexing number is insufficient in a spherical wave shift multiplex recording method.

Figure 3:
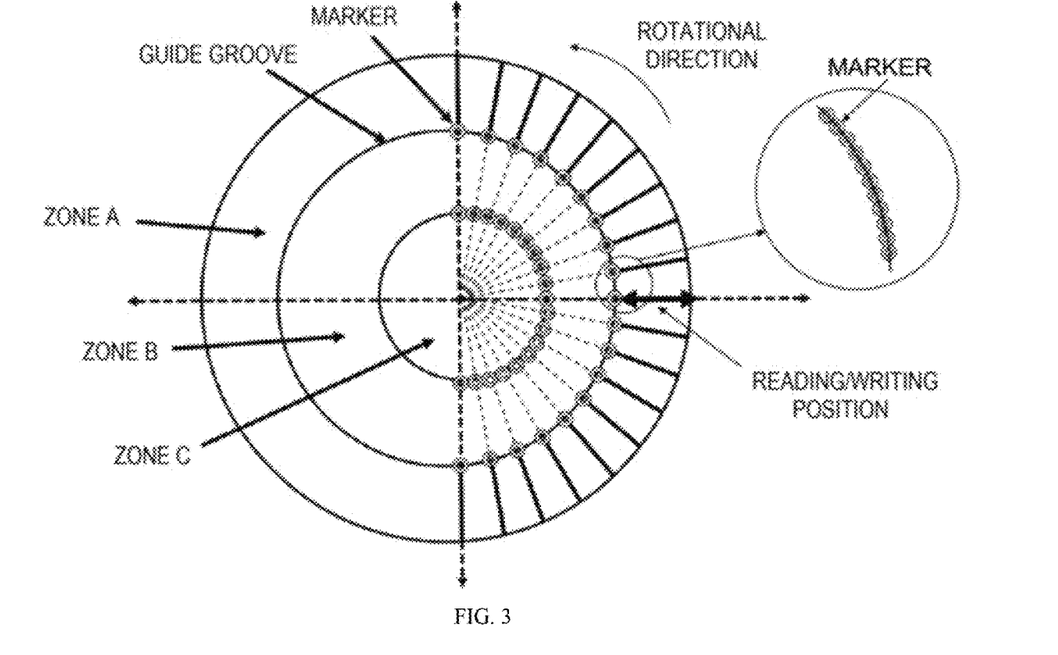
FIG. 3 is a distribution diagram of marker positions in a disk.

Embodiment 1 provides a positioning method for the hologram in the disk-type holographic storage medium, and an disk is used as the holographic storage medium. When the method is used for recording on the disk medium, the arrangement of marker points is shown in FIG. 3. The disk is divided into zones in a radial direction, each zone is provided with a circular guide groove for positioning, and a marker serving as a recording start position is formed on the circular guide groove. The width of the circular guide groove and the marker is about 0.5 μm. A marker interval is set to a distance at which crosstalk between adjacent holograms in a track circumferential direction does not become a problem. For example, the interval is set to about 500 μm. Marker information is usually detected by a laser light source having a wavelength different from that of a recording/reproducing light source, and is accessed by relative movement of an optical head and the disk, which is usually done by moving the disk. Therefore, the position of the optical head is not changed.

A recording/reproducing beam is preliminarily positioned first with positioning-beam detection markers when recording/reproducing is performed, and multiplex recording/reproducing of the hologram is performed when detecting the markers.

Figure 4:
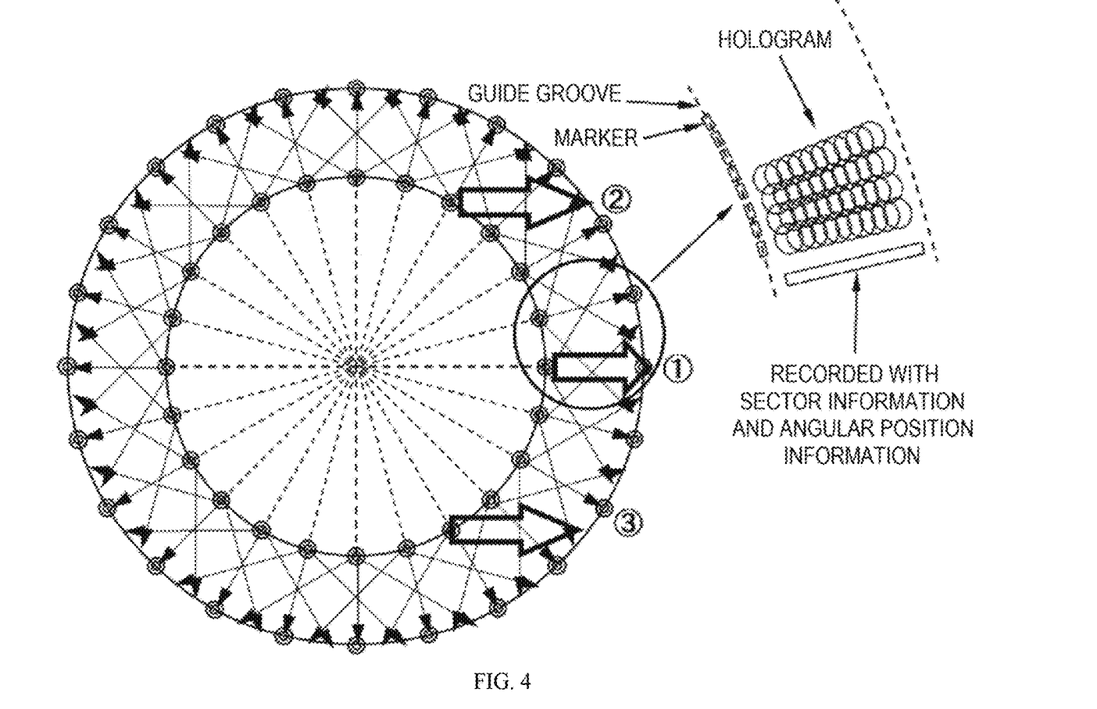
FIG. 4 is a schematic diagram of arranging marker positions when performing the cross-shift multiplex recording in a disk medium.

FIG. 4 shows the arrangement of the markers in the disk medium, in which the position of the optical head is not changed, and the start position of recording/reproducing is accessed by moving the disk. In FIG. 4, firstly, shift multiplex recording is performed in the direction of the arrow at position a $\hat{1}$. The disk is rotated every 500 μm in a circumferential direction to detect a marker position that is served as the start position to perform next shift multiplex recording. In this way, after completing recording, the disk is moved to positions $\hat{2}$ and $\hat{3}$ and the above process is repeated.

A crossing angle between directions of holographic grating vector in two hologram sequences obtained by shift multiplexing at positions $\hat{2}$ and $\hat{1}$ is about 50 degrees. The crossing angle between directions of holographic grating vector in two hologram sequences obtained by shift multiplexing at positions $\hat{3}$ and $\hat{1}$ is about −50 degrees, and the crossing angle between directions of holographic grating vector in two hologram sequences obtained by shift multiplexing at positions $\hat{3}$ and $\hat{2}$ is about 100 degrees. In this way, the cross-shift multiplex recording on the disk medium can be executed. A data block is composed of a plurality of hologram rows recorded at each position. As shown in a subgraph of FIG. 4, a partial area of the block records two-dimensional position information of the marker, recording zone information, angular position information indicating the recording start position.

In specific embodiments, each marker includes at least two-dimensional position information of the marker, and the recording/reproducing beam is positioned to a target marker according to the two-dimensional position information of the marker.

Starting from the marker, the recording/reproducing beam is accurately positioned according to a linear guide groove provided in a cross-shift multiplexing/reproducing direction.

The linear guide groove is provided with rotation angle information and sector information, and the recording/reproducing beam is accurately positioned according to the rotation angle information and the sector information to realize the multiplex recording/reproducing.

Figure 5:
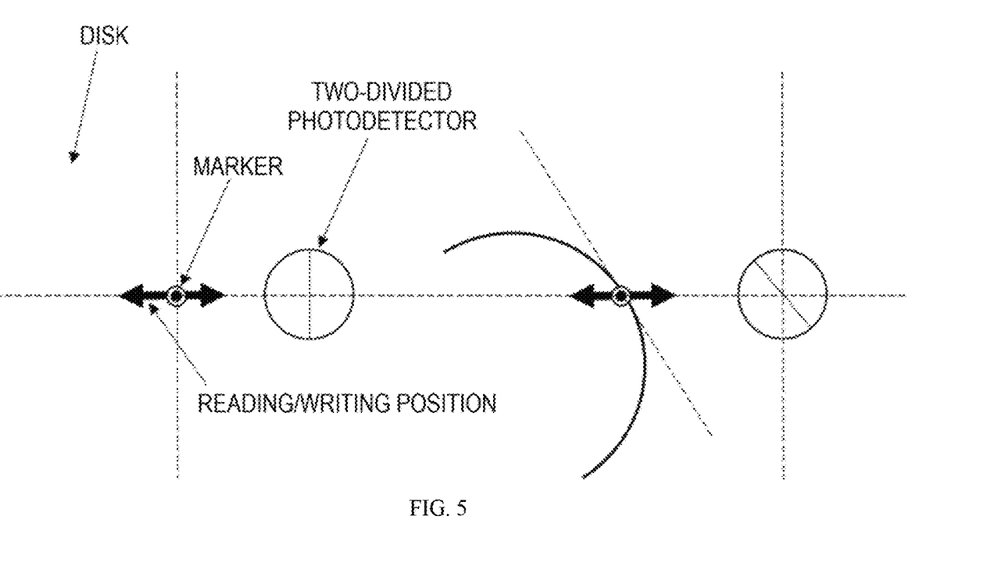
FIG. 5 is a servo signal detection method in the cross-shift multiplex recording.

FIG. 5 shows a servo signal detection method. A two-divided photodetector for detecting a servo signal must be arranged such that a dividing direction is always parallel to a tangent direction to the guide groove. In the cross-shift multiplex recording, since positioning is performed by movement of the disk, there is a case where a dividing line of the detector is not parallel to the tangential direction of the disk. Therefore, the direction of a two-divided line of the two-divided photodetector is needed to be adjusted according to the position of the disk.

The linear guide groove is provided with a plurality of patterns, and when recording/reproducing data, firstly a positioning beam is used to read a position deviation signal formed by the patterns in a liner guide groove direction and a direction perpendicular to the liner guide groove direction to detect whether a position of a recording/reading beam is correct, the recording/reading beam is controlled to a correct position according to the position deviation signal, and then recording/reading of the data is started.

The correct position is an optical track, position deviation is obtained by comparing a light intensity difference of the patterns in the liner guide groove direction and the direction perpendicular to the liner guide groove direction, and the light intensity difference on the optical track is 0 or a preset value.

Figure 6:
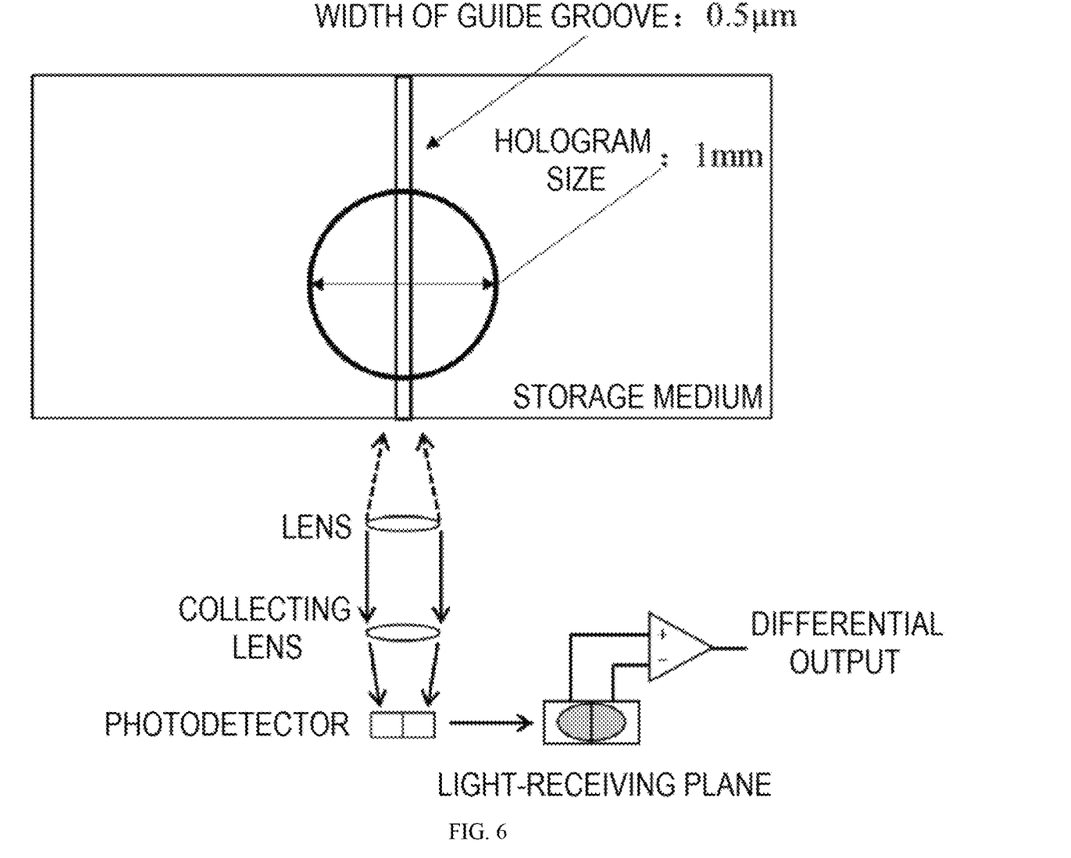
FIG. 6 is a marker and servo signal detection method.

The specific marker and servo signal detection method is shown in FIG. 6, which is the same as that used in conventional optical storage. Since widths of these markers or guide grooves are 0.5 μm to 1 μm and are sufficiently smaller than a hologram size of 1 mm, an influence on the hologram reproduction signal is almost negligible.

FIG. 7 is a structural diagram of an optical system used for the cross-shift multiplex recording in Embodiment 1. In addition to a recording/reproducing optical system, a laser optical system for positioning control and marker detection is separately installed with a light source having a wavelength different from that of a recording/reproducing system, and access is performed by moving the disk. Focus control and track control are performed by a lens attached to an actuator on an optical path.

Embodiment 2

As shown in FIG. 3, Embodiment 2 provides a disk-type holographic storage medium. A recording/reproducing area of a storage medium is formed with a circular guide groove and a linear guide groove, and the circular guide groove is provided with markers at a constant interval. The storage medium is divided into zones in a radial direction by the circular guide groove, and the linear guide groove extends in a direction of grating vector of a hologram while starting from marker positions.

Each marker includes two-dimensional position information of the marker.

The linear guide groove is provided with rotation angle information and sector information.

A plurality of patterns are recorded on the linear guide groove, and are symmetrical about the center line of the guide groove.

As shown in FIGS. 3 and 4, the disk-type holographic storage medium further includes a plurality of translation units. Each translation unit is composed of a plurality of grating vectors at a same distance, has the same direction of grating vector, and has holograms with different directions of grating vectors at the same position in a projection formed by a surface of the storage medium. A marker position is provided on the surface of the storage medium, the grating vector direction of the projection of each layer of two-dimensional hologram array on the surface of the storage medium at the same marker position is from the outside to the inside or from the inside to the outside, and the grating vectors at the same marker position form a fixed angle α that is equal to or larger than 45 degrees.

Embodiment 3

As shown in FIG. 7, Embodiment 3 provides a positioning device for a hologram in a disk-type holographic storage medium, including: a first optical system for recording/reproducing information and generating a recording/reading beam; a translation stage for supporting the translation of a storage medium provided with a circular guide groove and a linear guide groove; and a second optical system for generating a positioning beam used to position a recording/reproducing beam, in which the recording/reproducing beam and the positioning beam act on the same position of the storage medium, and multiplex recording/reproducing of the hologram is started to be performed along the liner guide groove by adopting the positioning beam to position the recording/reproducing beam on a marker of the circular guide groove.

Specifically, as shown in FIG. 7, a light emitted from a first laser 11 passes through a beam expander 20 and a first half-wave plate 31, and is split by a first polarizing beam splitter 41 into a reflected reference beam with vertical polarization and a transmitted signal beam with horizontal polarization. The transmitted signal beam is reflected by a first mirror 61 and loaded into a spatial light modulator 50 with an input modulated signal. The signal beam after modulation is incident again on the first polarizing beam splitter 41 and converges with the reflected reference beam, both of which then pass through a first relay lens group 71 and a low pass filter. A signal light and a reference light are then separated by a second polarizing beam splitter 42 and led to a signal light channel and a reference light channel respectively. The signal light is converged on the storage medium 100 by a third Fourier lens 93. The reference light passes through a second mirror 62 and a depolarizing beam splitter prism 80, adjusts a polarization direction to a horizontal direction through a half-wave plate 32, and is incident on the same position of the storage medium 100 through a first Fourier lens 91. Then the reference light interferes with the signal light to form the hologram.

At the same time, a second laser 12 generates the positioning beam that is led to the depolarizing beam splitter prism 80 after passing through a second relay lens group 72 and is incident into the storage medium with the reference light. The positioning beam is used to position the recording/reproducing beam at a specific position of the storage medium, and perform hologram recording/reproducing. When reproducing is performed, the reference light is incident on the same position, and a reproduction light is displayed by a high-speed camera 120 after passing through a fourth Fourier lens 94.

The positioning device further includes a servo system that controls a laser beam to move along the circular guide groove and the liner guide groove and ensures a the focused beam is focused on the medium.

The servo system includes a comparator 500. During a recording/reproducing process, detected information is fed back by the positioning beam to a two-divided photoelectric sensor 110. The comparator 500 is used for comparing a position deviation signal read by the positioning beam from a specific position of the storage medium, and driving the translation stage to support the translation of the storage medium according to the position deviation signal, so that the positioning beam and the recording/reproducing beam are located at a recording/reproducing position.

The position deviation signal is a light intensity difference of the same pattern at a specific position of the storage medium.

The translation stage includes a multiplexing-direction translation mechanism and a translation mechanism in a direction perpendicular to the multiplexing direction. The multiplexing-direction translation mechanism is used for controlling the translation stage to support the storage medium to translate in a shift multiplex moving direction of the storage medium, and the translation mechanism in the direction perpendicular to the multiplexing direction is used for controlling the translation stage to support the storage medium to translate in the direction perpendicular to the multiplexing direction, so that the positioning beam and the recording/reproducing beam are located on an optical track.

The multiplexing-direction translation mechanism includes a stepper translation mechanism which controls the translation stage to support the storage medium to translate while taking a distance moved during holographic storage shift multiplexing as a stepper distance in the multiplexing direction.

The translation stage also includes a preliminary positioning mechanism that controls movement of the storage medium such that the positioning beam and the recording/reproducing beam are located at the specific position of the storage medium.

The preliminary positioning mechanism includes a translation and/or rotation and/or inversion positioning mechanism.

The positioning method described in Embodiment 1 can be applied to the storage medium described in Embodiment 2 by using the positioning device described in Embodiment 3.

Obviously, the above embodiments of the present invention are merely examples for clear illustration of the technical solution in the invention, and are not intended to limit the implementations of the present invention. Any modification, equivalent substitution or improvement, improvement or the like within the spirit and principle of claims of the present invention should be included in the scope of the claims of the present invention.

The invention claimed is:

1. A positioning method for a hologram in a disk-type holographic storage medium used to position a recording/reproducing beam when holographic recording/reproducing is performed, wherein the storage medium is divided into zones in a radial direction, markers provided on circular guide grooves in each zone are taken as start positions of recording/reproducing, firstly the recording/reproducing beam is preliminarily positioned with positioning-beam detection markers when recording/reproducing is performed, and then multiplex recording/reproducing of the hologram is performed when detecting the markers, wherein starting from the marker, the recording/reproducing beam is accurately positioned according to a linear guide groove provided along a cross-shift multiplexing/reproducing direction, and wherein the linear guide groove is provided with a plurality of patterns, when recording/reproducing data, firstly a positioning beam is used to read a position deviation signal formed by the patterns in a linear guide groove direction and a direction perpendicular to the linear guide groove direction to detect whether a position of a recording/reading beam is correct, the recording/reading beam is controlled to a correct position according to the position deviation signal, and then recording/reading of the data is started.

2. The positioning method according to claim 1, wherein each marker includes at least two-dimensional position information of the marker, and the recording/reproducing beam is positioned to a target marker according to the two-dimensional position information of the marker.

3. The positioning method according to claim 1, wherein the linear guide groove is provided with rotation angle information and sector information, and the recording/reproducing beam is accurately positioned according to the rotation angle information and the sector information to realize multiplex recording/reproducing.

4. The positioning method according to claim 1, wherein the correct position is an optical track, position deviation is obtained by comparing a light intensity difference of the patterns in the linear guide groove direction and the direction perpendicular to the linear guide groove direction, and the light intensity difference on the optical track is 0 or a preset value.

5. The positioning method according to claim 1, wherein accesses to the circular guide groove, the linear guide groove and the markers are performed by relative movement of the recording/reading beam and the disk.

6. The positioning method according to claim 1, wherein the positioning beam is a reference beam or a beam from a light source different from that of the reference beam.

7. A positioning device for a hologram in a disk-type holographic storage medium, comprising:
   a first optical system for recording/reproducing information and generating a recording/reproducing beam;
   a translation stage for supporting translation of a storage medium that is provided with a circular guide groove and a linear guide groove; and
   a second optical system for generating a positioning beam that is used to position the recording/reproducing beam,
   wherein the recording/reproducing beam and the positioning beam act on the same position of the storage medium, and multiplex recording/reproducing of the hologram is started to be performed along the linear guide groove by adopting the positioning beam to position the recording/reproducing beam on a marker of the circular guide groove,
   wherein the positioning device further comprises a comparator for comparing a position deviation signal read by the positioning beam from a specific position of the storage medium, and driving the translation stage to support the translation of the storage medium according to deviation signal, so that the positioning beam and the recording/reproducing beam are located at a recording/reproducing position, and
   wherein a plurality of patterns are provided on the linear guide groove, and the position deviation signal is a light intensity difference of the same pattern on the linear guide groove.

8. The positioning device according to claim 7, wherein the translation stage includes a multiplexing-direction translation mechanism and a translation mechanism in a direction perpendicular to the multiplexing direction, the multiplexing-direction translation mechanism is used for controlling the translation stage to support the storage medium to translate in a shift multiplex moving direction of the storage medium, and the translation mechanism in the direction perpendicular to the multiplexing direction is used for controlling the translation stage to support the storage medium to translate in the direction perpendicular to the multiplexing direction, so that the positioning beam and the recording/reproducing beam are located on the optical track.

9. The positioning device according to claim 7, wherein the translation stage also includes a preliminary positioning mechanism that controls movement of the storage medium such that the positioning beam and the recording/reproducing beam are located at the specific position of the storage medium.

10. The positioning device according to claim 9, wherein the preliminary positioning mechanism includes at least one of a translation positioning mechanism, a rotation positioning mechanism, and an inversion positioning mechanism.

* * * * *